United States Patent
Hildebrand et al.

(10) Patent No.: US 12,045,898 B2
(45) Date of Patent: Jul. 23, 2024

(54) INTEGRATED CUSTOMER DELIVERY SYSTEM

(71) Applicant: Schlumberger Technology Corporation, Sugar Land, TX (US)

(72) Inventors: Ginger Hildebrand, Houston, TX (US); Mark Douglas, Aberdeen (GB); Hans Eric Klumpen, Austin, TX (US); Ravi G. Chandran, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/318,901

(22) Filed: May 17, 2023

(65) Prior Publication Data

US 2023/0376870 A1 Nov. 23, 2023

Related U.S. Application Data

(60) Provisional application No. 63/364,848, filed on May 17, 2022.

(51) Int. Cl.
*G06Q 50/02* (2024.01)
*G06Q 10/0631* (2023.01)
(Continued)

(52) U.S. Cl.
CPC ....... *G06Q 50/02* (2013.01); *G06Q 10/06313* (2013.01); *G06Q 10/06316* (2013.01); *G06Q 10/103* (2013.01); *G06Q 10/20* (2013.01)

(58) Field of Classification Search
CPC .......... G06N 20/00; G06N 3/02; G06N 5/022; G06N 5/046; G06N 3/042; G06Q 10/06;
(Continued)

(56) References Cited

U.S. PATENT DOCUMENTS

2003/0033191 A1* 2/2003 Davies ............... G06Q 10/0633
705/7.17
2006/0241997 A1* 10/2006 Bhatawdekar ......... G06Q 10/06
705/7.17
(Continued)

FOREIGN PATENT DOCUMENTS

CN 112130983 A 12/2020
KR 102089013 B1 3/2020
(Continued)

OTHER PUBLICATIONS

Qingfei Min et al. Machine Learning based Digital Twin Framework for Production Optimization in Petrochemical Industry, International Journal of Information Management, vol. 49, p. 502-519. (Year: 2019).*

(Continued)

*Primary Examiner* — Charles Guiliano
*Assistant Examiner* — Letoria G Knight
(74) *Attorney, Agent, or Firm* — Jeffrey D. Frantz

(57) ABSTRACT

A method includes receiving data from a plurality of heterogeneous systems, the heterogeneous systems configured to orchestrate operations in different aspects of field operations, selecting a subset of the data based on one or more attributes associated with a user, assembling a plan for conducting one or more of the field operations using at least one of the heterogeneous systems, displaying the subset of the data to the user in context with at least a portion of the plan, receiving a command from a user in response to the displayed subset of the data, and engaging one or more fulfillment engines of the plurality of heterogeneous systems to execute the one or more of the field operations in response to receiving the command.

20 Claims, 8 Drawing Sheets

(51) Int. Cl.
 *G06Q 10/10* (2023.01)
 *G06Q 10/20* (2023.01)
(58) Field of Classification Search
 CPC .............. G06Q 10/103; G06Q 10/20; G06Q 10/06313; G06Q 10/0637; G06Q 10/06312; G06Q 10/06316; G06Q 10/06315; G06Q 50/02; E21B 2200/20; E21B 2200/22; E21B 43/25; E21B 44/00
 USPC ..... 703/10; 705/7.23, 7.15, 7.17; 706/12, 45
 See application file for complete search history.

(56) References Cited

U.S. PATENT DOCUMENTS

| | | | |
|---|---|---|---|
| 2007/0179768 A1* | 8/2007 | Cullick | E21B 43/00 |
| | | | 703/10 |
| 2013/0035920 A1* | 2/2013 | Al-Shammari | E21B 43/12 |
| | | | 703/10 |
| 2019/0347125 A1 | 11/2019 | Sankaran et al. | |
| 2020/0320454 A1* | 10/2020 | Almashor | G06Q 10/04 |
| 2020/0334607 A1* | 10/2020 | Fadel | G06Q 10/06375 |
| 2021/0279629 A1* | 9/2021 | Nelson | G06F 11/3428 |
| 2021/0317726 A1* | 10/2021 | Tawil | G06Q 50/02 |
| 2022/0156667 A1* | 5/2022 | Bellenguez | G06Q 10/06375 |
| 2022/0358434 A1* | 11/2022 | Trivedi | G06Q 10/06313 |
| 2023/0076433 A1* | 3/2023 | Pathak | G06N 20/00 |
| 2023/0142580 A1* | 5/2023 | Elkhomri | E21B 41/00 |
| | | | 166/250.01 |
| 2023/0177441 A1* | 6/2023 | Durvasula | G06N 3/08 |
| | | | 706/45 |
| 2023/0229986 A1* | 7/2023 | Cami | G06Q 10/06312 |
| | | | 705/7.15 |
| 2023/0316150 A1* | 10/2023 | Phan | G06N 20/00 |
| | | | 706/12 |

FOREIGN PATENT DOCUMENTS

| | | | | |
|---|---|---|---|---|
| KR | 102190842 B1 | 12/2020 | | |
| KR | 1020220010356 A | 1/2022 | | |
| WO | WO-2022072921 A1 * | 4/2022 | ..... | G06Q 10/063118 |

OTHER PUBLICATIONS

Search Report and Written Opinion of International Patent Application No. PCT/US2023/022486 dated Sep. 6, 2023, 10 pages.

* cited by examiner

INTEGRATED CUSTOMER DELIVERY SYSTEM

CROSS-REFERENCE TO RELATED APPLICATIONS

This application claims priority to US Provisional Patent Application Ser. No. 63/364,848, which was filed on May 17, 2022, and is incorporated herein by reference in its entirety.

BACKGROUND

In complex industrial systems, teams of engineers, managers, and other personnel are assigned different roles and responsibilities to select, build, maintain, repair, and otherwise service equipment, construct facilities, and conduct potentially many other operations. Not only are there many different pieces of equipment to monitor and maintain, but there may also be several different service providers operating together in coordination with an operator (e.g., an "owner"), each serving different or potentially overlapping roles.

For example, in an oilfield production context, there may be one or more owners and several service providers. The owner might operate the well on a continuous basis, and may be involved in the design, drilling, construction, and production processes, and may have its own cost sensitivity/rules, risk profile, and/or other factors. The owner relies on the expertise of and coordinates with the different service providers for specific tasks involved in the construction and operation of the well, such as designing and planning the well, selecting equipment (e.g., bits, surface equipment, bottomhole assemblies, pumps, etc.) used to construct the well, designing and selecting the completion equipment (e.g., casing, tubing, pumping mechanism, etc.) and services (e.g., hydraulic fracturing) determining other parameters (e.g., bottomhole pressure, mud composition, facility design and construction, and conducting production operations), diagnosing problems with equipment, repairing equipment, replacing equipment, etc.

The service providers may leverage past experience with the specific owner or operator and/or acquire new information about the preferred practices of the owner, to perform its services. A single service provider may provide services for potentially many owners/operators, and an owner/operator may coordinate work from potentially many service providers. Moreover, determining what services are required may involve continuous monitoring of operations, modeling conditions, and input from subject matter experts.

In such complex systems that involve the coordination of the work of different entities on an on-going basis, there can be many potential challenges. For example, it is desirable for operations to be planned and executed, not in a silo, but in coordination with other activities, so that the larger project is completed efficiently. Moreover, the success, or at least efficiency, of the operations may depend at least partially on the experience and expertise of individual people within the overall system, which can present challenges and inconsistent results.

SUMMARY

Embodiments of the disclosure include a method that includes receiving data from a plurality of heterogeneous systems, the heterogeneous systems configured to orchestrate operations in different aspects of field operations, selecting a subset of the data based on one or more attributes associated with a user, assembling a plan for conducting one or more of the field operations using at least one of the heterogeneous systems, displaying the subset of the data to the user in context with at least a portion of the plan, receiving a command from a user in response to the displayed subset of the data, and engaging one or more fulfillment engines of the plurality of heterogeneous systems to execute the one or more of the field operations in response to receiving the command.

Embodiments of the disclosure also include a non-transitory, computer-readable medium storing instructions that, when executed by at least one processor of a computing system, cause the computing system to perform operations. The operations include receiving data from a plurality of heterogeneous systems, the heterogeneous systems configured to orchestrate operations in different aspects of field operations, selecting a subset of the data based on one or more attributes associated with a user, assembling a plan for conducting one or more of the field operations using at least one of the heterogeneous systems, displaying the subset of the data to the user in context with at least a portion of the plan, receiving a command from a user in response to the displayed subset of the data, and engaging one or more fulfillment engines of the plurality of heterogeneous systems to execute the one or more of the field operations in response to receiving the command.

Embodiments of the disclosure include a computing system including one or more processors, and a memory system including one or more non-transitory, computer-readable media storing instructions that, when executed by at least one of the one or more processors, cause the computing system to perform operations. The operations include receiving data from a plurality of heterogeneous systems, the heterogeneous systems configured to orchestrate operations in different aspects of field operations, selecting a subset of the data based on one or more attributes associated with a user, and assembling a plan for conducting one or more of the field operations using at least one of the heterogeneous systems. Assembling the plan includes determining an actionable insight based on data representing a condition of a physical component or a system of components and one or more digital twins representing the physical component. Determining the actionable insight includes modeling one or more oilfield conditions using a computer model. The computer model is run without interaction from the user. Determining the actionable insight also includes determining one or more consequences of one or more actions that can be taken in response to the actionable insight based at least in part on an output of the computer model, and selecting one or more of the actions as recommended. The operations further include displaying the subset of the data to the user in context with at least a portion of the plan. Displaying includes presenting at least one of the one or more consequences to the user along with the selected one or more actions. The operations also include receiving a command from a user in response to the displayed subset of the data, and engaging one or more fulfillment engines of the plurality of heterogeneous systems to execute the one or more of the field operations in response to receiving the command.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Customer Delivery System

Figure 1:
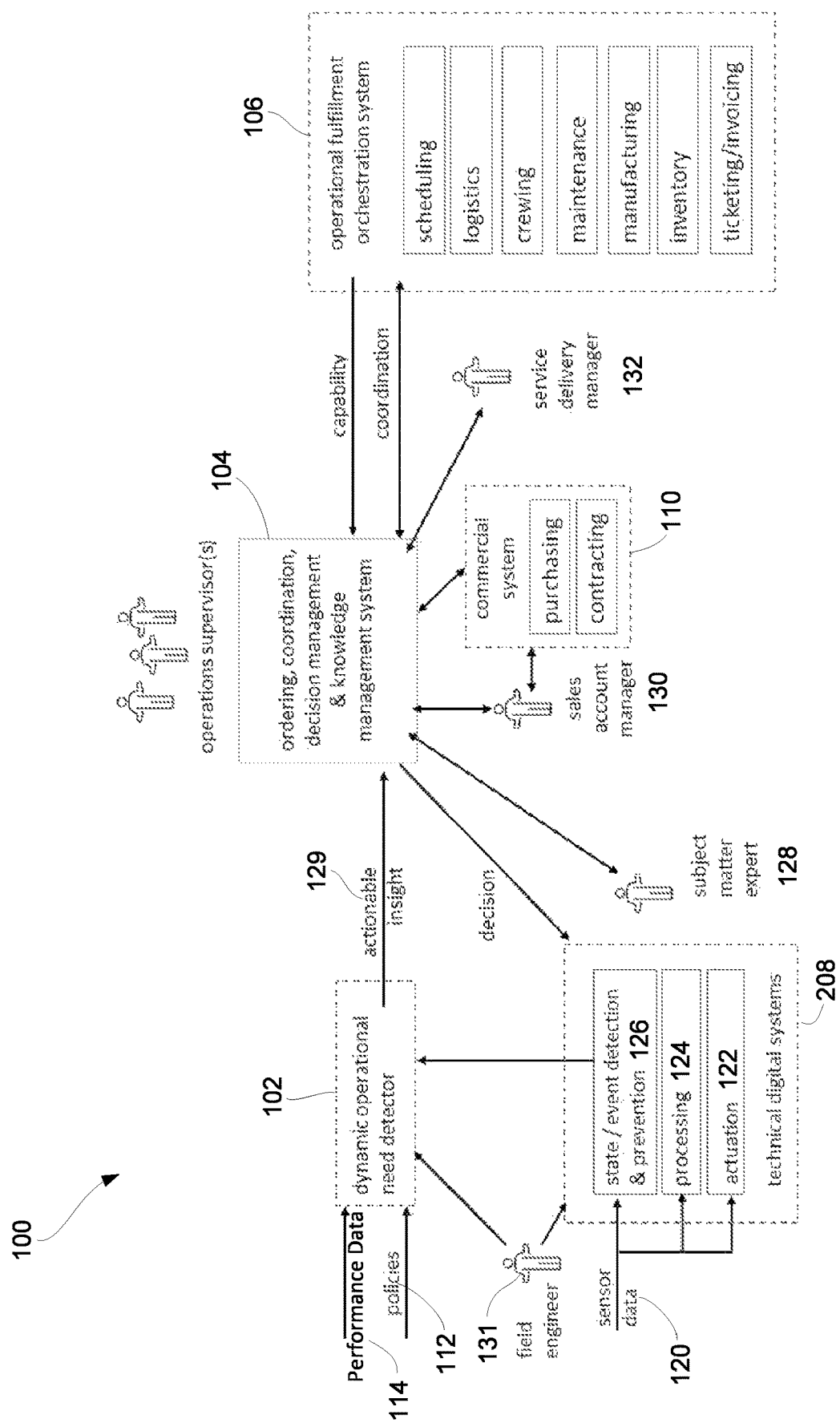
FIG. 1 illustrates a block diagram of a system for coordinating design, operation, and maintenance of complex systems, according to an embodiment.

FIG. 1 illustrates a block diagram of a system 100 for coordinating design, construction, operation, and maintenance of complex systems, e.g., oilfield systems, solar power generation systems, wind power generation systems, geothermal power generation systems, carbon capture systems, abandoned energy generation systems, according to an embodiment. The system 100 may employ one or more "digital twins", which are described in greater detail below with reference to FIG. 3. In general, a digital twin may be a digital representation of a physical component, system, entity, and/or environment (e.g., reservoir fluid system, well, subsurface environment). For example, a specific piece of equipment may have a digital twin (e.g., a pump, drill bit, logging device, top drive), which may provide information about its component parts, usage history, service records, maintenance, etc. In another example, an entity's digital twin may represent various features about the entity, such as its operating history, past decisions, apparent risk tolerance based on its historical practices, financial profile, carbon footprint, water footprint, required authorizations before operations are permitted, drilling simulators, production models, etc. The digital twins may be updated as new information about the component, entity, etc., is received, and may be employed to make decisions that affect the equipment, systems owned or otherwise associated with the entity, etc. In some embodiments, the historical record associated with the digital twin may be employed as labeled training data (e.g., pairs of contextual data and decisions or other results) that may be fed to artificial intelligence (e.g., a machine learning model such as a neural network). In other embodiments, the digital twin may include rules-based policies provided by a user (e.g., service provider, regulatory agency, and/or operator/owner). The system may then be configured to make determinations or recommendations instead of, or in addition to, a human user, thereby facilitating workflows that call for such determinations or recommendations.

Referring to the specific, illustrated embodiment, the system 100 may include a dynamic operational need detector 102, a coordination and management system (also referred to herein for simplicity as a "management system") 104, an operational fulfillment orchestration system (also referred to herein for simplicity as an "orchestration system") 106, and a technical digital system 108. It will be appreciated that there may be several detectors 102, orchestration systems 106, and/or technical systems 108, as will be described below. The system 100 may further include one or more commercial systems 110, which may include financial or transactional systems, e.g., accounting, invoicing, contracting, purchasing, etc., software and/or hardware.

The detector 102 may receive policies 112 and performance data 114. The policies 112 may set forth operational constraints imposed by the owner service provider, and/or regulatory body, e.g., equipment operating envelopes, maintenance triggers, operating safety constraints, etc. The performance data 114 may include operational plans, performance envelopes for different pieces of equipment and/or systems of equipment and the environment, etc. In at least some embodiments, the dynamic need detector 102 may store or at least access a digital twin of the "owner" (owner is used herein to denote the entity responsible for operation of a piece of equipment, but not necessarily one that has legal ownership) of equipment that is being monitored by the technical system 108. It will be appreciated that a single piece of equipment, entity, environment, etc., may have two or more, and potentially many, digital twins. For example, digital twins may be received from various sources, such as a service company, operator, equipment manufacturer, or another third party. Further, the digital twins may be for individual equipment components or more broadly for systems that include such components (hardware) and its interaction with the subsurface system (e.g., OLGA®, PIPESIM®, and/or a drilling simulator).

The dynamic operational need detector 102 may interface with the technical system 108 and receive feedback therefrom, representing, e.g., sensor data or inferences made therefrom about the operation of the equipment. The technical systems 108 may be a physical-system level controller and/or data acquisition equipment. Accordingly, in at least one embodiment, the technical system 108 may receive sensor data 120 from one or more pieces of equipment being monitored. Based at least in part on the sensor data 120, the technical system 108 may provide commands to the equipment, so as to cause actuation 122 of components thereof. Such actuation may include modulation of the operation of the equipment (e.g., changing flow rates, speed, etc.).

Moreover, the technical system 108 may process 124 the sensor data 120 and may detect equipment states, determine operational states, and/or take actions to avoid or prevent certain future states, as indicated at 126. For example, sensor data 120 may include information permitting inferences to be made about the operational state and conditions, such as influx of fluid or fluid losses during drilling. The technical system 108 may be configured to execute or otherwise interface with various processing platforms, and may be configured, for example, to conduct forward modeling or other predictive applications to support its state/event detection and prevention 126 functionality. One or more subject matter experts 128 may also interface with the technical system 108 so as to provide feedback thereto and/or otherwise control or observe the operation of the equipment being monitored. Furthermore, a field engineer 131 may assist in controlling the equipment and providing additional details related to the operational health thereof to the dynamic operational need detector 102.

Accordingly, operational data about the equipment being monitored may be fed from the technical system 108 to the dynamic operational need detector 102. As noted above, the operational need detector 102 may also receive policies and/or performance parameters, operating envelopes, etc., which may provide a framework for evaluating the operational data. A digital twin, as described above, may be employed by the dynamic operational need detector, e.g., so as to permit evaluating the operation of the equipment monitored by the technical systems 108.

In response, for example, to an event, state, or another trigger (e.g., sensor data indicating operation outside of envelope or another fault, predicted fault, expiration of a maintenance interval, etc.), the dynamic operational need detector 102 may generate an actionable insight 129. An "actionable insight" may refer to any suggested operation that may be recommended for a given system or piece of equipment based on operational input and/or profile for the owner of the equipment. The actionable insight may include data representing an action that may be recommended, e.g., repair/replace equipment, change operation, etc. Further, the actionable insight may be determined at least partially using the digital twin of the equipment and/or the owner of the equipment, e.g., based on historical actions taken in similar contexts, operational history, financial resources/profile, etc. In at least one example, the actionable insight may identify a problem (e.g., anomalous operation) and one or more actions that can be taken as a solution.

The management system 104 may receive the actionable insights 129 from the detector 102. Although not illustrated, in at least some embodiments, the management system 104 may also receive input directly from the technical system 108 (and/or any other technical systems), as well as from the subject matter expert 128. The management system 104 may further interface with the orchestration system 106 and the commercial system 110. In at least some embodiments, the management system 104 may provide a user interface which may curate information received from the other components of the system 100 and provide the information to a user (e.g., the owner of the equipment), and receive input directly from the user.

For example, the management system 104 may receive and display the actionable insights 129. In some embodiments, the management system 104 may further process the actionable insights 129, e.g., in accordance with a digital twin to the equipment being monitored, the entity that owns the equipment, or both. Moreover, as the management system 104 receives input, whether operational input (e.g., from sensors, field engineers, etc.) or command input from the user, the management system 104 may update the relevant digital twin.

Based on the profile (e.g., part of the digital twin) for the owner, the management system 104 may interface with a sales account manager 130, e.g., via the commercial system 110, so as to authorize actions associated with the actionable insight. Further, the management system 104 may interface with the orchestration system 106 to coordinate provision of a service, equipment sale, etc. In at least some embodiments, the orchestration system 106 may be selected based on capability and availability. For example, the orchestration system 106 may include functions for scheduling, logistics, crewing, maintenance, inventory, and/or ticketing invoicing. In at least some embodiments, the orchestration system 106 may provide feedback as to availability of several options, which may differ in time, capability, cost, suitability, efficiency, carbon footprint, water, footprint, and/or other factors. Such different options may be provided to the management system 104, which may solicit a selection from the owner. In at least some embodiments, the number of options may be reduced (e.g., some options rejected/selected) based on the digital twin. For example, a given pump replacement may be outside of cost constraints, or the timing for delivery of a bottomhole component may be too long to be suitable for the owner. In at least some embodiments, the orchestration system 106 may be part of the management system 104, such that the management system 104 is configured to match tasks, profiles, timelines, etc., with the appropriate orchestration system 106.

Once an appropriate option is selected by the management system 104, presented to the owner, and authorized, the management system 104 may coordinate provision of the option through the orchestration system 106. The orchestration system 106 may then acquire resources (e.g., equipment, service personnel, etc.), schedule and perform various tasks, e.g., via coordination with a service delivery manager 132, and provide updates to the owner via the management system 104.

Accordingly, the system 100 may be configured to continuously monitor equipment and/or operations, recognize when certain actions may be desirable, provide updates to a user (e.g., equipment owner), select among several options to satisfy the desirable action, and coordinate implementation of the action. The system 100 may also execute one or more digital twins, which may facilitate, or make, an automatic selection among the options, and, further, may facilitate recognizing the desirable actions, e.g., based on equipment and/or user history and other attributes.

Figure 2:
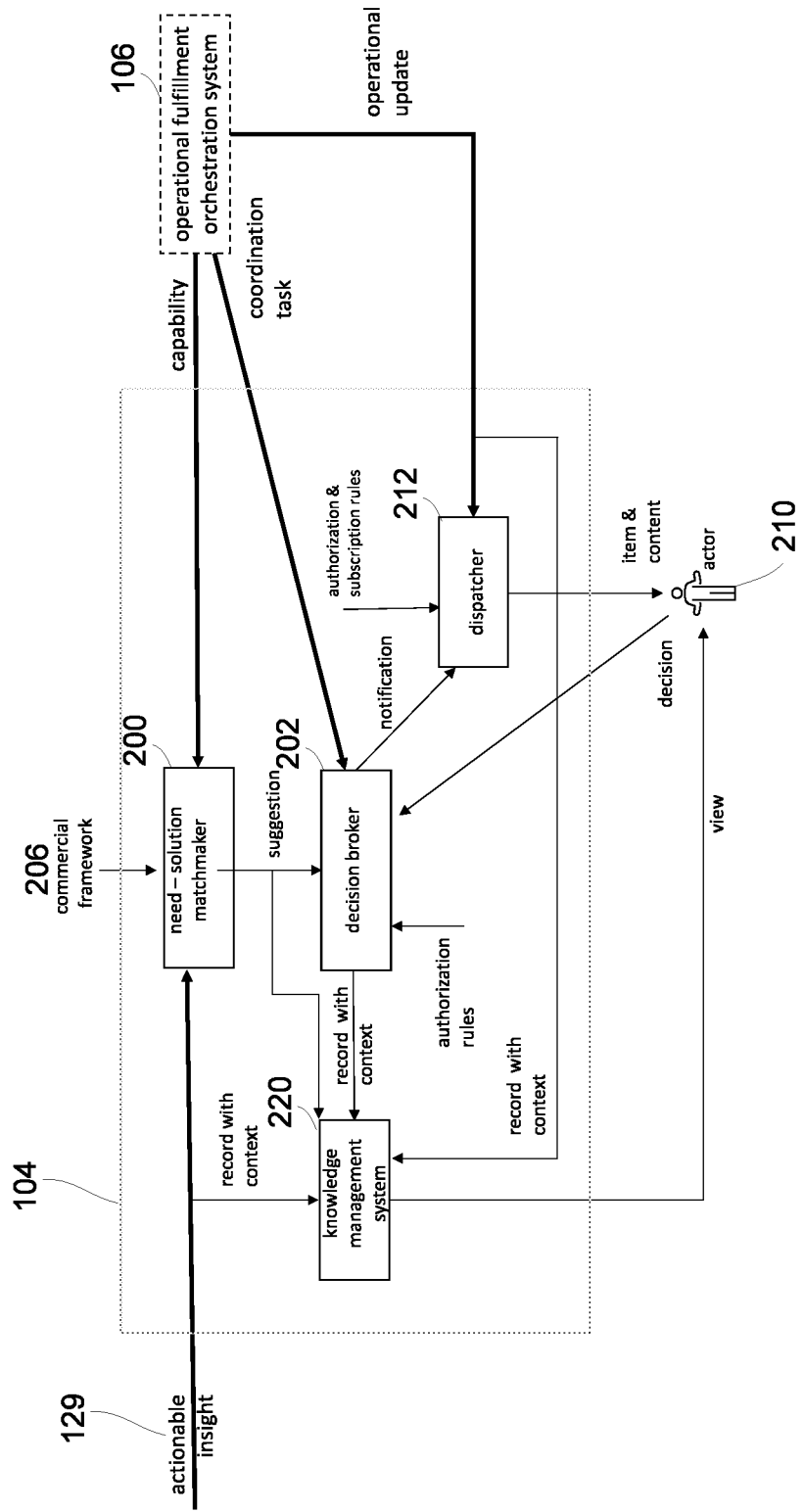
FIG. 2 illustrates a more detailed block diagram of the management system, according to an embodiment.

FIG. 2 illustrates a more detailed block diagram of the management system 104, according to an embodiment. As noted above, actionable insights are received into the management system 104. In particular, the management system 104 may include a need-solution matchmaker 200. The need-solution matchmaker 200 may provide a suggestion (e.g., a suggested action) to a decision broker 202. The need-solution matchmaker 200 may determine the suggestion based on a commercial framework 206, the actionable insight 129, the capabilities of available orchestration systems 106, and/or based on the digital twin or other information about the owner, the equipment, or both. As noted above, such capabilities may include availability (and timing) as well as subject matter expertise and experience.

The decision broker 202 may acquire the authorization rules, e.g., as set by the owner, and consult with an actor (e.g., specific personnel designated by the owner) 210, e.g., via a user interface. Specifically, the authorization rules may match operations, commands, actions, etc., with personnel whose authorization is required to permit performance of such operations, commands, actions, etc. For example, the authorization rules may specify those with responsibility for making decisions related to specific operations, equipment, etc. The actor 210 may provide his/her decision (e.g., a selection from among several choices based on the capabilities of the orchestration system 106, one or more digital twins, etc.) to the decision broker 202. The decision broker 202 may then implement the decision of the actor 210, e.g., via a notification to a dispatcher 212. The dispatcher 212 may coordinate with the orchestration system 106 to provide the item, service, etc., to the owner system.

A record of the actionable insight, suggestion, decision, action, and any other context data may be provided to a knowledge management system 220. The knowledge management system 220 may maintain the digital twin of the owner, the equipment, or any other component of the physical system being monitored. The knowledge management system 220 may update the digital twin based on what actually occurred, thereby refining the digital twin. This context can be used to help the customer easily find the information about a product or service purchased in the past (e.g., an owner's manual, equipment configuration specification), place a new order similar to a previous one, and order the right follow on products and services e.g. the correct replacement part. Further, the digital twin may be configured to make suggestions to repair and/or increase efficiency of the equipment, such as information related to suggestions for spare parts and/or aftermarket items based on the equipment, customer's configuration, purchase history, etc. As more context and response data is provided to the knowledge management system 220, it may begin to recognize patterns in the context and response, e.g., via machine learning. The knowledge management system 220 may thus eventually be employed to reduce the number of options to those it is confident that are among the choices that the owner will select, based on the historical pattern of the owner's decisions. The knowledge management system 220 may also be configured to make contextually relevant suggestions based on what the owner is likely to need given past purchases by that owner or other (e.g., similarly situated) owners. In at least some embodiment and with sufficient training, the machine learning model may eventually be able to accurately predict user commands (selections of actions) based on actionable insights, e.g., to reduce the number of recommended actions, make contextually relevant action suggestions, and/or to make decisions in place of the actor 210 or other personnel.

Figure 3:
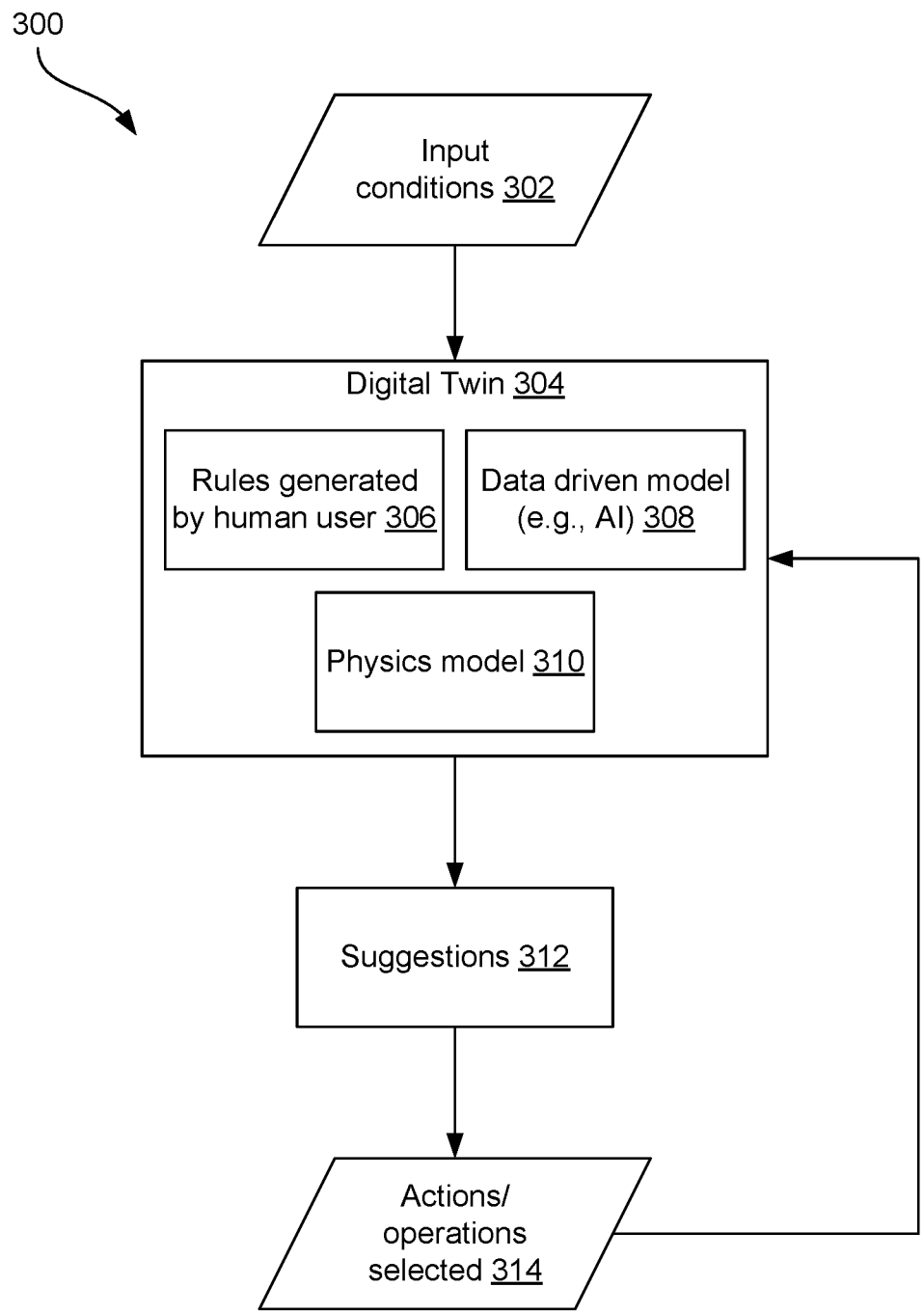
FIG. 3 illustrates a block diagram of a workflow that includes a digital twin, according to an embodiment.

FIG. 3 illustrates a block diagram of a workflow 300 that implements a digital twin, according to an embodiment. The workflow 300 may be implemented as a part of one or more embodiments of the system 100 discussed above, or in others. The workflow 300 may include receiving input conditions 302, e.g., sensor measurements, user input, operational performance data, model outputs, etc. The input conditions 302 may be fed to a digital twin 304. Although a single digital twin 304 is shown, several may be implemented concurrently to model a single system, component, operation, entity, environment, etc. As discussed above, the digital twin 304 may be stored in and executed by one or more of several different components of the management system 104 of FIGS. 1 and 2. For example, referring to FIG. 3, the knowledge management system 220 may store and/or execute the digital twin 304. In other embodiments, the need-solution matchmaker 200 or another component may store and/or execute the digital twin 304.

As shown in FIG. 3, the digital twin 304 may include one or more components. For example, the digital twin 304 may include rules generated by a human user, as shown in box 306. The rules may specify a variety of different aspects related to the operation of a piece of equipment, entity, environment, system, process, or combination thereof. The rules may be policies, experience-based parameters, and/or preferred practices for individual entities. The rules, for example, may specify requirements or preferences for timing, accounting, authorization, cost, vendor identity, equipment type, carbon footprint, water footprint, etc. Further, the rules may specify suggested actions ("suggestions") based on inputs, such as operation adjustment, repair/replace component, spare/after-market part identification, and others.

The digital twin 304 may also or instead include a data-driven model, as in box 308. The data-driven model may include artificial intelligence (AI), such as a trained machine-learning model, e.g., a neural network, trained to recognize patterns between inputs and outputs, and make predictions of outputs based on the inputs, e.g., without performing physics-based calculations or requiring human intervention. For example, the data-driven model may determine that an operation is anomalous based on sensor readings, and predict a solution that a user may implement (e.g., generate an actionable insight). The data-driven model may also be configured to select one or more solutions from a plurality of available solutions. The available solutions may, for example, be provided by the rules of box 306, and the AI may predict which of the available solutions may be employed.

The digital twin 304 may further or instead include a physics model, as shown in box 310. The physics model may be a model of a physical characteristic, e.g., operating condition, geologic or other environmental condition, etc. The physics model may be configured to recognize anomalous operation, operational hazards, suggest parameter values, etc. The physics model may be constructed based on inputs collected from and otherwise representing a physical domain, and then use equations of state or other physics-based operations to generate an output, such as a simulated operation, detection of anomalous activity, etc. The rules or data-driven model may implement output from the physics model, in some embodiments.

The digital twin 304 may thus be implemented to facilitate, or executed in order to generate, one or more suggestions as shown in box 312, and also shown in FIG. 2. The suggestion may prescribe one or more actions to take in response to a detection of an anomalous operating condition, or any other trigger. The suggestions may be displayed to an operator, e.g., via a user-interface, or may be automatically implemented in some cases, e.g., via artificial intelligence.

The workflow 300 may then proceed to selecting actions/operations, at box 314, e.g., based on the suggestions in box 312. These may be implemented as discussed above, e.g., using the orchestration system 106, decision broker 202, dispatcher 212, actor 210, etc. The results of the selection and/or the results of the implementation of the selected action (e.g., changes in operation of the equipment) may be fed back to the digital twin 304, and may be employed to facilitate subsequent decision-making.

Figure 4:
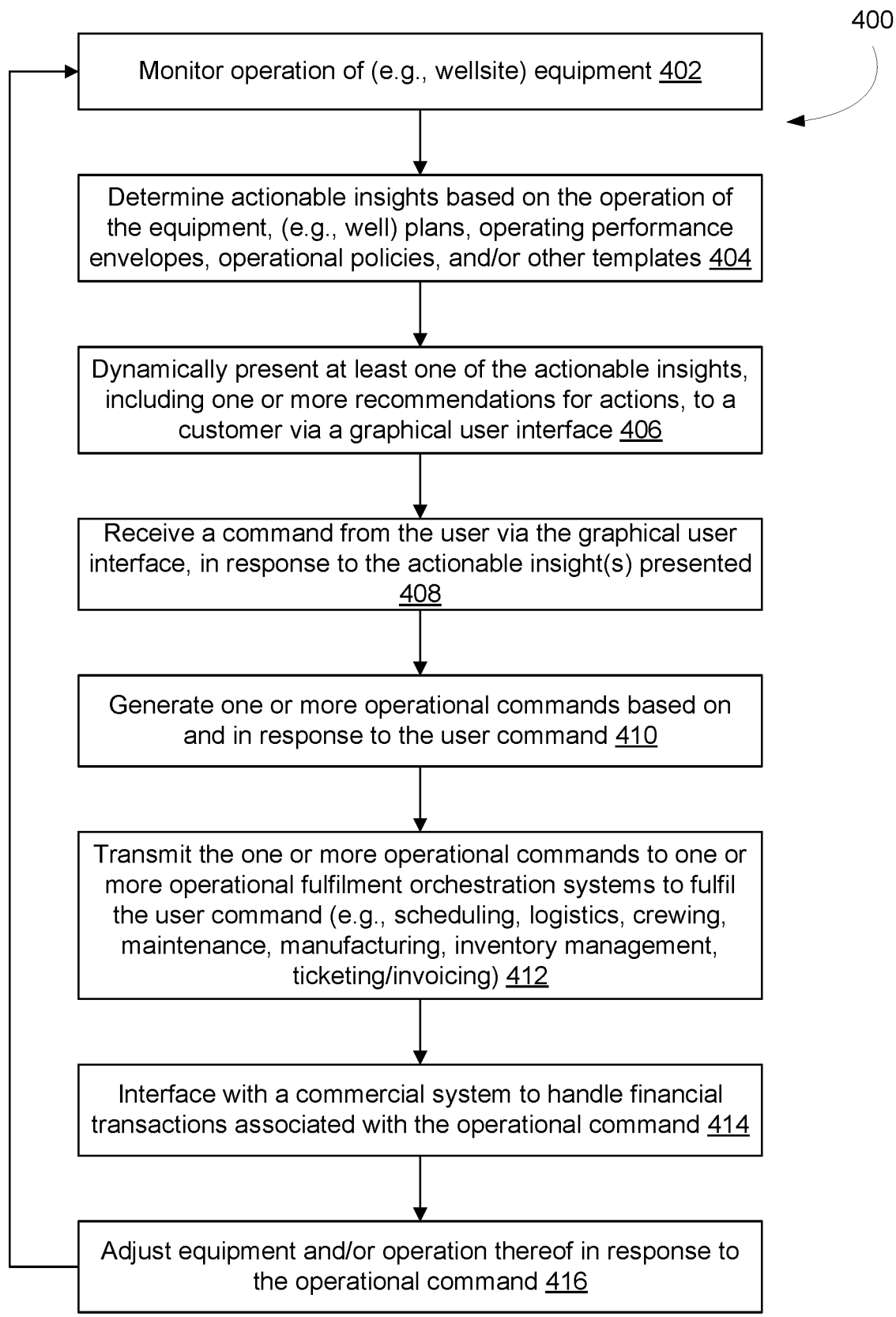
FIG. 4 illustrates a flowchart of a method for managing systems, e.g., oilfield systems that include equipment, according to an embodiment.

FIG. 4 illustrates a flowchart of a method 400 for managing systems, e.g., oilfield systems that include equipment, according to an embodiment. The method 400 may be executed in the order presented, or in any other order, and/or various aspects of the method 400 may be combined, performed simultaneously, split into two or more discrete actions, etc.

Referring additional FIG. 4, the method 400 may include monitoring operation of (e.g., wellsite) equipment, as at 402. The wellsite equipment may include any equipment used to explore, drill, complete, produce, or otherwise constructed and/or operate a well. Further, in at least some embodiments, the method 400 may be employed in other industrial settings, such that the equipment may be non-wellsite equipment.

The method 400 may also include determining actionable insights 129 based on the operation of the equipment, one or more plans/profiles, operating performance envelopes, operational profiles, and/or other templates, as at 404. Collectively, such factors may be considered as input to the method 400, and may be static or dynamic rules-based factors. In at least some embodiments, however, these factors may be dynamic, and may be updated based on actions taken by operators, performance characteristics, or other factors. In at least some examples, such factors may be considered as part of a "digital twin" of the equipment, which may dynamically store information about the operation and history of a piece of equipment, e.g., in combination with certain tendencies of the user (e.g., owner) associated therewith. Further, as will be described in greater detail below, the actionable insights 129 may be determined based on inventory availability, cost consciousness of the user, timing, performance, efficiency, carbon footprint, water footprint, and/or any other factor. Thus, although multiple courses of action may be provided to handle a single situation, the actionable insights may be curated subsets of the possible courses of action, based on the user's parameters, tendencies, other equipment, and realities of inventory availability and timing.

The method 400 may further include dynamically presenting at least one of the actionable insights, including one or more recommendations for actions, to a user via a graphical user interface, as at 406. As noted above, the actionable insights may include and/or be selected from among many possible courses of action. Further, the recommendations for actions may be selected from among many possible actions, e.g., based on efficiency, availability, cost, operating conditions, carbon footprint, etc. Execution of one or more of the recommended actions may result in the situation that prompted the actionable insight to be resolved, or at least mitigated. The graphical user interface may present several such recommended actions to the user. In at least some embodiments, the graphical user interface may include the option for a user to purchase a carbon offset based on the action selected.

The method 400 may also include receiving a command from the user via the graphical user interface, in response to the presented actionable insights, as at 408. The user may select, or delegate authority to another person to select, or may provide policies a priori that provide pre-authorization for certain activities, to initiate the execution of one or more of the recommended courses of action in order to handle the actionable insight.

The method 400 may then include generating one or more operational commands based on and in response to the user commands, as at 410. For example, the system 100 may select an orchestration system 106 for implementation of commands with the goal of executing the selected recommended actions. For example, the command may be to order and install a certain piece of equipment, perform maintenance, generate a service call, etc.

The method 400 may then include transmitting the one or more operational commands to one or more operational fulfilment orchestration systems to fulfil the user command, as at 412. For example, the orchestration system 106 may perform scheduling, logistics, crewing, maintenance, manufacturing, inventory management, and/or ticketing/invoicing functions, in order to coordinate and implement execution of the user command among one or more service providers.

The method 400 may further include interfacing with a commercial system to handle financial transactions associated with the operational command, as at 414. For example, the commercial system 110 may interface with the orchestration system 106 in order to generate invoices/tickets, and collect payment from the user. The commercial system 110 may also pay vendors, track payments, and gain authorization from user personnel, e.g., according to a policy implemented by the user.

The method 400 may also include adjusting the equipment and/or operation thereof in response to the operational command, as at 416. As noted above, this can include repairing or replacing equipment, performing maintenance, conducting evaluation of performance in greater detail, conducting another service, acquiring another piece of equipment, among other possibilities. Specifically, one or more service providers contracting with the owner via the orchestration system 106 may provide repairs, replacement, or other services.

Figure 5:
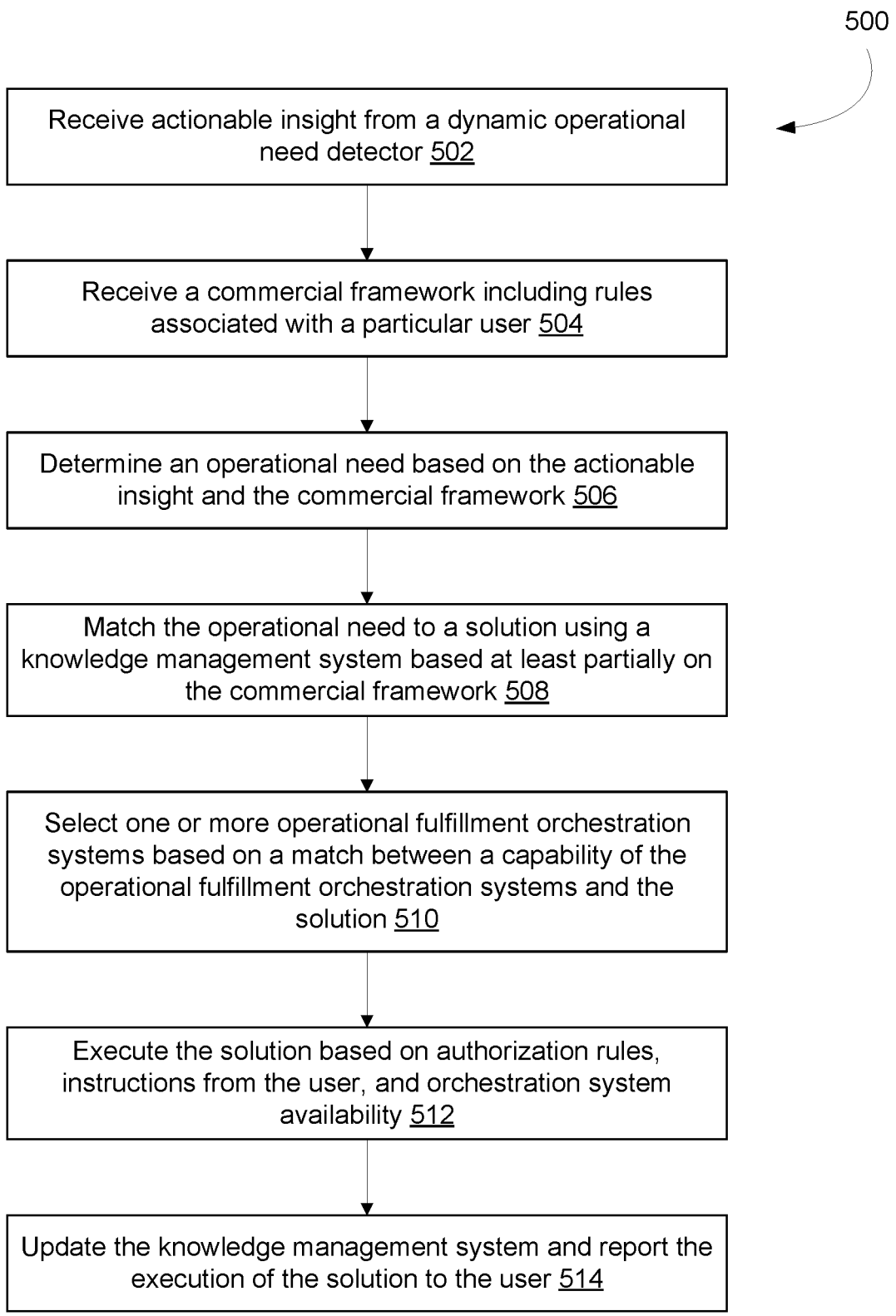
FIG. 5 illustrates a flowchart of a method for operating an ordering, coordination, decision management, and knowledge management system, according to an embodiment.

FIG. 5 illustrates a flowchart of a method 500 for operating an ordering, coordination, decision management, and knowledge management system, according to an embodiment. Referring additionally to FIG. 5, the method 500 may, in some embodiments, be executed at least partially by the management system 104. In other embodiments, the method 500 may be executed using other systems, devices, etc. The method 500 may be executed in the order presented, or in any other order, and/or various aspects of the method 500 may be combined, performed simultaneously, split into two or more discrete actions, etc.

The method 500 may include receiving an actionable insight from a dynamic operational need detector 102, as at 502. The actionable insight may include data representing an anomalous operation (or any other trigger, e.g., duration, repair schedule, useful lifecycle information, etc.) and/or one or more possible remediation courses of action to address such anomalous operation.

The method 500 may also include receiving a commercial framework including rules associated with a particular user, as at 504. The commercial framework may include a profile for the user, such as authorization required, people able to grant authorization, internal roles for the user's personnel (e.g., accounts payable, engineers, operators, etc.). The commercial framework may also indicate cost sensitivity and/or other factors, such as environmental considerations (e.g., preference for reducing carbon footprint). The commercial framework may also include details specific to individual owners, such as preferred parts, vendors, system components, etc.

Next, the method 500 may include determining an operational need based on the actionable insight and the commercial framework, as at 506. For example, the actionable insight may specify that a piece of equipment is operating outside of design parameters. The commercial framework may specify a timeframe, cost sensitivity, authorization levels, operational efficiency, historical decision-making tendencies, environmental preferences (e.g., emissions, power usage), etc., of the user. The need-solution matchmaker 200 may then match the actionable insight with an operational need and a solution, e.g., using the knowledge management system 220 and based at least partially on the commercial framework, as at 508. For example, the actionable insight may provide various recommendations for remediating an anomalous operation, such as putting the equipment offline, repairing or replacing (e.g., based on timeline, cost, carbon footprint, etc.) the equipment, or the like. The solution/operational need, determined based on the owner's profile (e.g., digital twin), rules, policies, preferences, etc., may be to fix or replace the equipment, e.g., depending on the confidence level of the diagnosis from the sensor data in the actionable insight, the level of authorization required for a replacement versus first troubleshooting, etc., which may be determined using the equipment's digital twin and/or the commercial framework. Thus, the operational need may be a subset of the possible actions from the actionable insight.

Further, the system 104, e.g., the need-solution matchmaker 200, may present the solutions to a user via a graphical user interface, and solicit instructions from the user. In some embodiments, the need-solution matchmaker 200 may communicate with the decision broker 202 in order to determine what authorizations are needed and from whom (e.g., the actor 210), and acquire the authorizations required by the owner's policies. In some embodiments, the need-solution matchmaker 200 and/or the decision broker 202 may present such requests for authorization graphically to the actor 210 via the graphical user interface. Further, in some embodiments, several possible operational needs may be presented to the actor 210, who may then choose one of the actions to implement, based on the actor's 210 operating preferences.

The method 500 may then proceed to selecting one or more operational fulfillment orchestration systems 106 based on a match between a capability of the operational fulfillment orchestration system 106 and the solution, as at 510. For example, several operational fulfillment orchestration systems 106 may be available, and each may have different capabilities, timelines, etc. The management system 104 may maintain profiles (e.g., digital twin) representing the capabilities and availability of the different orchestration systems 106 (e.g., the service providers controlled therethrough), and may thus select among the available systems 106.

The method 500 may then include executing the solution based on authorization rules, instructions from the user, and orchestration system 106 availability, as at 512. As discussed above, each of these factors (or any subset thereof) may go into identifying, selecting, and provisioning the resources for implementing the solution. Thus, the management system 104 may be configured to choose, get authorization for, and implement the solution, e.g., by coordinating the operations of one or more service providers, in-house personnel, owner personnel, etc.

The method 500 may then include updating the knowledge management system 220 and reporting the execution of the solution (e.g., updating status in real-time) to the user, as at 514. Such reporting may be done via the graphical user interface discussed above. The knowledge management system 220 may be updated to record the outcome of the solution. For example, the knowledge management system 220 may store information about whether the solution was successful (and metrics that measure how successful), such as costs/efficiency, timeline, carbon footprint changes, operational impact, etc. Such information may facilitate the system 104 determining more efficient solutions in subsequent iterations of operation. Further, combinations of actionable insights, selections by the user, and/or information about whether the solution was successful may be fed as training data to a machine learning model. The machine learning model may thus recognize over time what the user's preferences are, and what they are likely to select as a course of action given a particular set of operating conditions, and/or to winnow down the possible solution choices based on such user preferences and/or the likely success of implementing any given solution. Here again, this may be stored as parts of a digital twin for the user (e.g., user preferences) and/or the equipment (e.g., success of specific solutions for this equipment).

EXAMPLES

Referring to FIGS. 1 and 2, an electronic submersible pump (ESP) workover or replacement may provide a convenient example, but merely one example among many implementations considered for the system 100. Accordingly, the ESP may be the equipment monitored by the technical system 108. Digital twins of the owner of the ESP and the ESP itself may be generated and implemented. At some point, the monitoring system (e.g., sensors feeding the technical system 108) may detect an operational anomaly within the data, e.g., the pump goes offline or is otherwise operating outside of normal parameters. The recognition of the anomaly may be determined based at least in part by reference to the digital twin of the ESP. The digital twin may, for example, establish a design envelope for normal operation (which may be preprogrammed and static or dynamically determined based on operation over time), such that sensor input measurements outside of this design envelope, indicate anomalous operation. In some embodiments, the subject matter expert 128 may review the operational data to confirm the issue, but in other embodiments, this may be automated and may not consider human input.

The operational need detector 102 may match the issue with one or more operational solutions. In this case, such solution may include acquiring a pulling service to pull the pump and troubleshoot the issue or install a replacement pump. This actionable insight may be provided to the management system 104, which identifies one or more options to satisfy this actionable insight, given the digital twin of the owner, authorization rules, timelines, const sensitivity, etc. The management system 104 may, in some embodiments, identify and present complementary products and services for inclusion, e.g., a sand guard if sanding conditions are observed and if such produce is available in inventory. The management system 104 may also determine and suggest alternatives that provide enhancement of operation, e.g., lower carbon footprint or include services that have lower carbon requirements, in situations where multiple services would provide the solution. The owner may then select and schedule the operation, and the orchestration system 106 may be used to direct fulfillment of the selected operation. As noted above, the outcome of the operation, including the operating context, history of the equipment, the available alternatives that were not selected, may be fed back to the knowledge management system 220. The knowledge management system 220 may learn from this data and may be configured to provide fewer, but more likely to be selected, options in the future, given similar circumstances.

Another example of use of the system 100 may be in the context of equipment maintenance. The inputs to the system 100 may be the identification of the piece of equipment, service history of the equipment, and in some cases, digital monitoring system information. The operational need detector 102 may then identify recommended maintenance operations based on regulatory certification requirements, equipment manufacturer recommendations (e.g., based on runtime or operational conditions), customer policies based on runtime or operational conditions, digital twin recommendations (e.g., based on system-knowledge of the status/history of the equipment and/or the owner).

The system 100 may then present, e.g., via a user interface provided by the management system 104, one or more recommended maintenance operations to the operator for consideration, along with pricing, timing, availability, and/or other financial terms. The operator in turn selects and schedules the maintenance operation to be applied, and the orchestration system 106 fulfils the operation.

Drilling services may provide yet another example of operation of the system 100. For example, the system 100 may receive as input a drilling plan, a real-time drilling monitoring system, and an operating envelope. The real-time drilling monitoring system may recognize a drilling condition that falls outside of (or is projected to fall outside of) the operational envelope e.g., lost circulation or high friction conditions. The operational need detector 102 may thus identify one or more recommended remediations to the operator, e.g., application of lost circulation materials, the inclusion of an agitator in the toolstring, and/or the inclusion of a surface oscillating systems. The management system 104 presents one or more recommended operations to the operator for their consideration along with the pricing and other financial terms on this job or subsequent job with similar profiles. The operator selects and schedules one of the remediation operations to be applied, and the orchestration system 106 directs the fulfilment of the remediation operations.

Another example of operation may include an ESP refurbishment and reinstall versus replacement decision and operation. The system 100 may be applied to an ESP, which may or may not include a digital monitoring system as part of the technical system 108. The technical system 108 may detect an operational signature indicating the pump has failed. The subject matter expert 128 may additionally or instead detect a pump failure. The operational need detector 102 matches the issue (e.g., pump failing) with options for remediation based on service provider inventory, customer held inventory, existing pump design, and/or current flow profile. For example, the operational need detector 102 may review different options including: pull the pump, refurbish the pump and reinstall; pull the pump, replace the pump immediately with a new pump with the same design then refurbish the current pump and reserve for future use; pull the pump, replace the pump immediately with an appropriate pump that has been refurbished previously and then refurbish the current pump for future use; or pull the pump, replace the pump immediately with a new pump designed for the current flow profile, then refurbish the current pump and reserve for future use. The management system 104 may present one or more suggested operational solutions to the operator for their consideration along with the pricing and other financial terms as well as availability considerations and carbon information. For example, the management system 104 may select a subset of those available options, e.g., based on the history of the user. The operator selects and schedules one of the technical operations to be applied. The orchestration system 106 may then direct the fulfilment of the technical operation.

User Interaction Based on Relevance

In at least some embodiments, the knowledge management system 104 may interact with human users (e.g., customers, subject-matter experts, field engineers, vendors, etc.) based on relevance. For example, the knowledge management system 104 may create a "newsfeed" that presents data to a human user. The data in the newsfeed may be updated, e.g., in real time. The knowledge management system 104 may curate this data, so that a very large amount of data that may be available from many different, heterogeneous systems may be presented to a user based on the attributes of the user, the preferences of the user, insights into the user (and/or processes being executed or overseen by the user), external data analysis, and service/equipment offerings.

Figure 6:
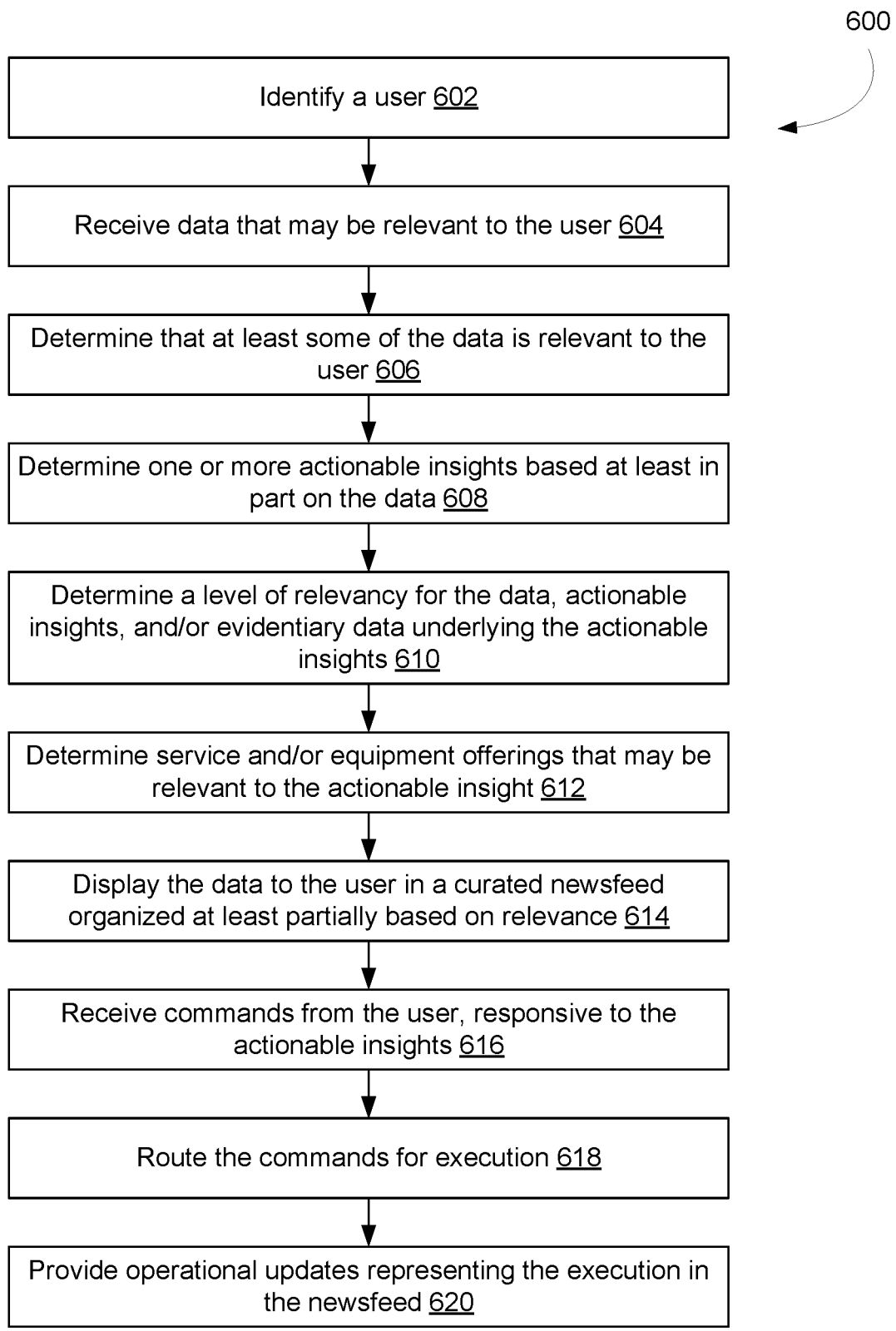
FIG. 6 illustrates a flowchart of a method for interacting with a user based on relevance, according to an embodiment.

FIG. 6 illustrates a flowchart of a method 600 for user interaction based on relevance, according to an embodiment, which may implement one or more embodiments of the system 100. The method 600 may begin by identifying a user, as at 602. The user may be identified, for example, by credentials, such as login information, biometrics, IP address, other identification information, etc. The user may be associated with a profile of attributes and/or preferences. Accordingly, upon identifying the user, the user's stored attributes and preferences may be accessed by accessing the user's profile, as at 604.

The attributes of the user may include entitlements, which may be, for example, entity (company) level. For example, data may not be passed between different companies, as the data may be proprietary to the individual companies. Accordingly, a user associated with one entity may not be entitled to, and thus may be prevented from, viewing data related to another company. In some cases, a company may purchase access to proprietary data stores, and thus the entitlements may include access to such proprietary data stores. Further, the entitlements may be position or role specific, e.g., related to the user's responsibilities in operations. For example, a field engineer for ESPs may have different entitlements than a sales engineer, account manager, or a service representative. Additionally, the attributes and entitlements may be at least partially determined based on geographical location. For example, a user (or entity) may be associated with a particular field or basin, which may tend to make information related to that geographical area, or areas that have been determined to have similar characteristics, more relevant.

The user's profile may also include preferences. Preferences may be rules established by the user, whereas attributes may be rules imposed by the system or other actors who are not the user. A user's preferences may be a static list or a dynamic list, e.g., the preferences may be modified according to a user's historical patterns of interactions. The user's preferences may include specific types of data for an operation, activity, etc., which may narrow down the data from the entirety of the data to which the user is entitled. For example, based on a user's individual experience, the user may decide that information from a certain basin is more relevant to a particular operation than information from another basin, and may thus prioritize the display of information gathered from the more-relevant basin. Further, a user may be more familiar with data from a particular offset well (e.g., the user may have been involved in the construction of the offset well) and may thus choose to use the familiar data and lower the relevance of (or even exclude) data from other offset wells. At least some of the preferences may be generated as "subscriptions", in which a user may subscribe to a particular data set, which may be dynamic. Thus, for example, changes in the dynamic data may be displayed to the user as part of the newsfeed, as will be discussed in greater detail below.

The method 600 may then include receiving data that may be relevant to the user, as at 604. The data may be associated with equipment, systems, sites, processes, or other elements associated with the user's entity (employer), role, geography, etc. The data may be "raw", e.g., measurement data received from the technical systems 208 of FIG. 2. Such raw data may include, for example, measurements of various well operating conditions, such as downhole pressure, production rate, weight-on-bit, or any other measurement that may be generated by a physical oilfield system such as an oilfield exploration system, well drilling system, well completion and/or production systems, and/or the like. The data may also include data from external source, such as contextual data, e.g., offset well data, from which inferences about a subject well may be drawn. The data may also represent current events, e.g., news, that may be relevant to oilfield operators in general.

The method 600 may include determining that at least a portion of the data is relevant to the user, as at 606. The determining at 606 may proceed based at least in part on the identity of the user, e.g., the attributes, preferences, context, etc., associated with the user.

The method 600 may also include determining one or more actionable insights based at least in part on the data, e.g., the relevant data, as at 608. The actionable insights may be at least partially determined based on historical user data, tendencies of the specific user, historical data for other, similarly-situated users, offset well data, computer modeling, or any combination thereof. In at least some embodiments, the actionable insights may be determined by the system 100 without the interaction of the user, e.g., by automatic interactions (e.g., task scheduling) with subject matter experts in relevant fields, computer models of the relevant systems, combinations thereof, etc. Accordingly, the system 100 and method 600 may facilitate the user coordinating activity among multiple different disciplines from a centralized platform.

The actionable insights may be related to equipment, sites, operations, etc., that are associated with, and thus relevant to, the user. For example, the actionable insights may be provided by or based at least partially on information from the technical digital systems 208. As a specific, illustrative example, referring additionally to FIG. 2, a user may be associated with a well that is being produced using artificial lift. The technical digital system 208 may provide pressure information, e.g., represented by measurements taken in the well. These measurements may be passed to the dynamic operational need detector 102, which may determine that the pressure is degrading (e.g., based on rules, historical data, computer modeling, etc.), and that a consequence is likely to occur, e.g., reduced production, if a corrective action (e.g., servicing or replacing a pump) is not taken. This insight, e.g., pressure is degrading, and the consequence of taking no action, may be determined relevant to a particular user based on the attributes of the user, e.g., the user is entitled to the data based on his or her position and company, and the user's preferences.

At least some insights may be derived from software modeling engines. As noted above, the user may, in at least some embodiments, not have the responsibility of running the model or simulations based thereon, but rather may receive the conclusion of the model and monitor and/or take actions based thereon. For example, data-driven and/or physics-based modeling engines may be used to interpret data received from the technical systems 208 in order to provide such conclusions (e.g., predictions, forecasts, etc.). Using the "digital twin" or other information about the equipment, systems, etc., relevant to the measurements, the modeling engines may be called upon to forecast the consequences of different (or no) actions in the field. The results of the modeling engine(s) may be provided to the user, e.g., as part of a "second level" of the newsfeed, for review.

Such modeling data may serve as a proof or "evidentiary data" from which the actionable insight was derived, and may be useful for review in the case that the user is a subject matter expert. In addition, the evidentiary data may include offset well analysis or other data from similar processes, equipment, and/or other experiences that are similar to a given process, equipment, or other experience. That is, historical data about what actions were taken, e.g., by the user and/or other, similarly-situated users, may be provided to the user via the newsfeed. This information may be stored and accessed, e.g., as part of the digital twin for the equipment, system, entity, etc.

Although the user/subject matter expert may disagree with the results and reach different conclusions, nevertheless, the relevant data may have been presented, facilitating the subject matter expert's decision-making. In some examples, such "second level" information may be integrated into the newsfeed as a click-to-expand or pop-up window in the newsfeed. Accordingly, because, for example, different users may be more or less interested in the data behind the actionable insight, such detailed data may not be presented as a default, but by selection from an interested user.

The actionable insight generation process may leverage heterogenous systems, such as measurements/data sources from different sites, equipment, and/or processes, and even different disciplines (e.g., physical monitoring and digital modeling), as well as contextual data. Further, financial systems may also be included, providing cost/benefit analysis to different actions that may be incorporated into the actionable insights.

Relative relevance (e.g., a level of relevancy) of the data, actionable insights, and evidentiary data underlying the actionable insights may also be determined, as at 610. That is, certain items that are generally considered relevant to a user may have different levels of relevancy. For example, a temporal factor of the data may be incorporated, e.g., applying a preference for recent or urgent items and/or items with new information to view (e.g., a status change). Criticality of the actionable insights may also be considered, e.g., the consequences of not taking action in a short timeframe may be employed to determine the level of relevancy. Based on the determined level of relevancy, items of high relevance may, in subsequent worksteps herein, tend to be displayed more prominently and/or often to the user.

Additionally, service and/or equipment offerings that may be relevant to the actionable insight may be determined, as at 612. For example, an offering for a service that the user has (or similar users have) employed historically and/or one or more alternatives that may be attractive based on price, efficiency, efficacy, equipment/service availability, innovation, or a combination thereof may be determined. The offering may be determined based at least partially on the actionable insight, providing, e.g., an alternative to the consequence associated with no action. The offering may also be associated with the contextual data (e.g., historical information about what the user has done and/or similarly situated users have done) when confronted with similar conditions. The offering may also be determined at least partially based on entity information; for example, some entities may exclude equipment from certain manufacturers, or may have rules for or against certain equipment repairs or replacement. The offering may also take into consideration carbon footprint and the carbon footprint sensitivity of the user/entity.

Once deemed relevant, and a level of relevancy determined, at least some of the data determined in 604-612 may be provided to the user as part of a curated newsfeed, as at 614, which may provide data to the user, e.g., in real-time, and/or may permit interaction with the user, e.g., to take actions in response to the insights. For example, the newsfeed may include alerts, which may be generated in response to a new actionable insight. The alerts may provide information to the user about the nature of the actionable insight, and the user may provide responsive data, such as a level of interest or commands for actions to take. The user may also forward the alert to another user, e.g., to delegate response to the actionable insight. Such alerts may include the second-level data discussed about, such that the user may probe into the specific details underlying the actionable insight.

The method 600 may include receiving commands via user interaction with the newsfeed from the user, in response to the actionable insights, as at 616. When commands for actions are received, they may be routed to the orchestration system 106 of FIGS. 1 and 2 for execution, as at 618. The orchestration system 106 of FIG. 1 may gather any financial or management approvals based on the protocols established for the entity associated with the user, equipment, site, etc. The orchestration system 106 may also organize equipment/parts delivery, schedule service calls, etc.

Information about such operations, executed in response to instructions from the user, may be populated into the newsfeed, so as to provide operational updates to the user, as at 620. For example, once an actionable insight is acted upon, a tracking newsfeed item may be provided and determined relevant to the user. The tracking newsfeed item may be updated in real time based on feedback from vendors, service providers, equipment measurements, etc. The user may be able to view the tracking newsfeed items, monitor the progress of the activity, provide additional commands, etc.

Accordingly, it will be appreciated that the method 600 for providing relevant data to a user and receiving commands from the user, that is, interaction based on relevance, may be implemented. The method 600 may be specifically tailored for oilfield operations. In particular, oilfield operations may generally call for coordination among multiple different heterogenous systems in potentially multiple different disciplines, across potentially multiple different vendors. Further, oilfield operations may call for technical expertise, such as in implementing software modeling, as well as physical operations such as replacing equipment in the field. Moreover, the disciplines may rely on information and/or service from one another, which can be a daunting task for a well operator. The presently disclosed method 600 may thus provide a customer-experience layer for exploration, drilling, completion, production, and any other phase of well operations, which may join together potentially multiple different types of computer modeling to support relatively simple actionable insights that may be quickly decided upon and/or implemented by a well operator, while adhering to the protocols established for implementing such actions (e.g., gathering any authorizations called for) within a specific company. This data may be provided to a user in real-time, thus permitting the user to stay updated on the progress of different specific operations as well as overall performance of the well operations.

In at least some embodiments, the method 600 may be provided to curate a newsfeed, interact with a user, and facilitate management of various oilfield processes in well exploration, in well planning, in well drilling operations, in production management operations, or the like.

Figure 7:
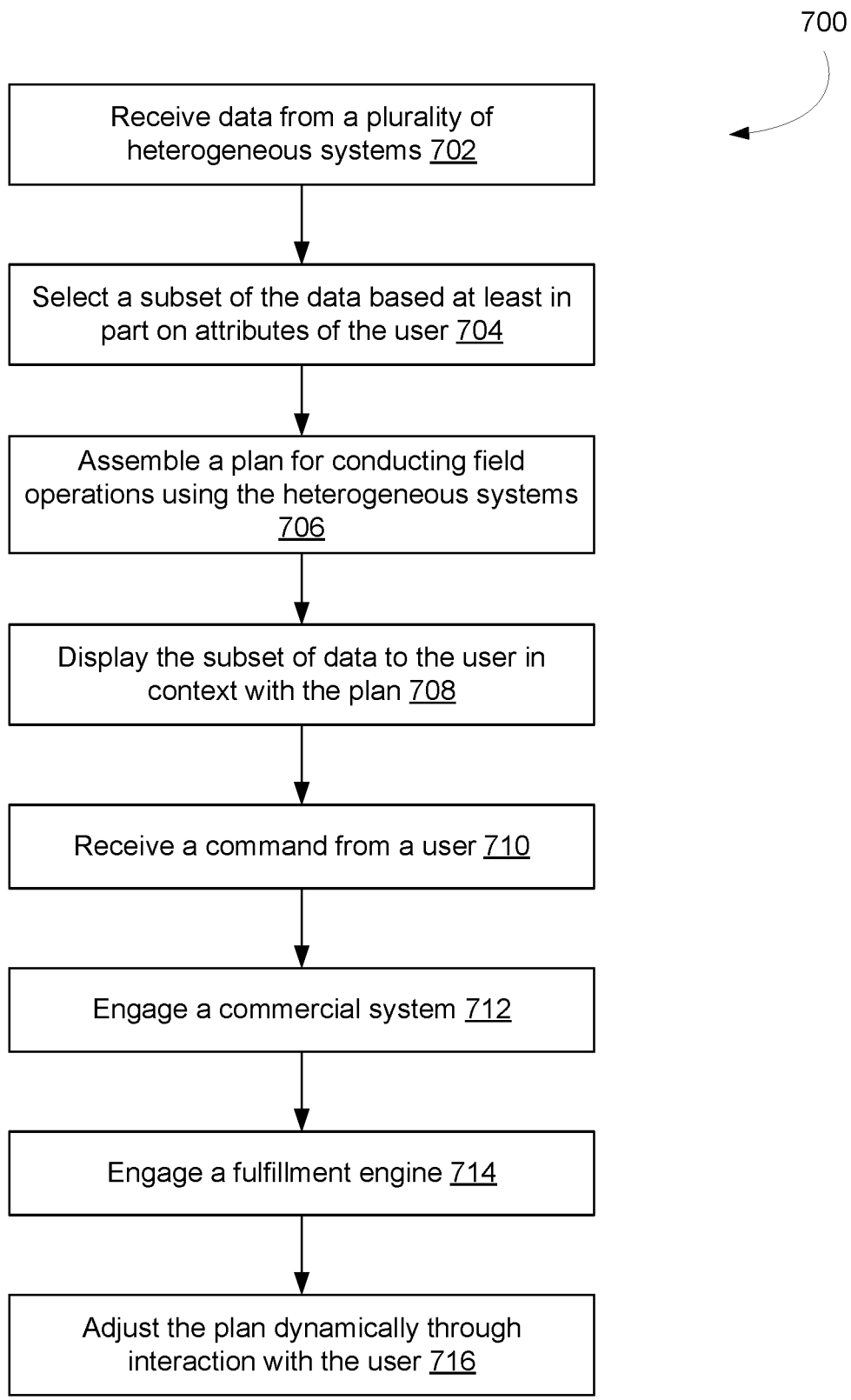
FIG. 7 illustrates a flowchart of a method, according to an embodiment.

FIG. 7 illustrates a flowchart of a method 700, according to an embodiment. The method 700 includes receiving data from a plurality of heterogeneous systems, as at 702. The heterogeneous systems may be configured to orchestrate operations in different aspects of field operations. As the term is used herein, "orchestrate" means "to arrange or control the elements of, as to achieve a desired overall effect." That is, orchestrate can include active control of physical systems in some embodiments, but in other embodiments, may monitor data inputs and/or arrange for other systems to take physical actions. Further, "heterogeneous systems" refers to computing components and physical systems configured to perform different field (e.g., oilfield) tasks. For example, a drilling control system and a subsurface geological modeling system are two examples of heterogeneous systems, which may orchestrate different aspects of oilfield operations.

The method 700 may also include selecting a subset of the data based on relevance of the data to the user, e.g., based at least in part on one or more attributes associated with a user, as at 704. Attributes of the user may include rules (e.g., externally imposed authorizations based on the user's employer, job responsibility, clearance, etc.), preferences (e.g., in one embodiment a user's subjective determination of what is useful/relevant to him or her, in another embodiment an algorithmic determination of what might be useful/relevant to a user based upon rules, tendencies, etc.), and/or context and insights.

The method 700 may further include assembling a plan for conducting one or more of the field operations using at least one of the heterogeneous systems, as at 706. In at least some embodiments, the plan may be a sequence of actions to be taken across two or more heterogeneous systems, which are coordinated to achieve an overall task. In an example, the plan includes a listing of scheduled events, a status of a request at stages of a lifecycle. Further, the plan may provide an indication of an activity and a timing of conducting the activity.

For example, replacing an ESP may include planning for monitoring, suggesting repairs, receiving authorization, matching a service vendor with the wellsite and task, and providing status updates of the service vendor's progress to the user. It will be appreciated that any individual or subset of the foregoing could be provided, and the other aspects omitted, without departing from the scope of the plan. In at least some embodiments, the plan is prepared from discrete different tasks in different environments using two or more of the plurality of heterogeneous systems.

The method 700 may also include displaying the subset of the data to the user in context with at least a portion of the plan, as at 708. In at least some embodiments, displaying may include curating a newsfeed of events based on relevance to the user, a temporal proximity of the events, or a combination thereof. Thus, the user's display may be individually tailored to what the system considers, based on rules, tendencies, etc., to be relevant to the user.

The method 700 further includes receiving a command from a user in response to the displayed subset of the data, as at 710. The command may be entered using any input device via interaction with the newsfeed, for example.

The method 700 may additionally include engaging a commercial system of the plurality of heterogeneous systems to execute at least one commercial action in response to the command, as at 712. Commercial systems may include databases of company-specific purchasing protocols or rules. For example, the databases may specify role authorizations for different transactions, prices, preferred vendors, deliverables, etc. Such systems may engage in sending messages or otherwise soliciting authorization from the relevant roles, and may transact between financial institutions to effect payment, for example.

The method 700 may further include engaging one or more fulfillment engines of the plurality of heterogeneous systems to execute the one or more of the field operations in response to receiving the command and the at least one commercial action that was executed, as at 714. Such fulfilment engines may include communications systems that select and interact with service vendors, providing information thereto and monitoring the status of work done thereby. This status may be fed into the newsfeed, e.g., in real time, for the user's review.

The method 700 may also include adjusting the plan dynamically in response to user interaction with a series of events or prompts that the user follows to make decisions, as at 716. For example, a work status may be displayed, and the user may change the work order in response to the work status. For example, an unforeseen issue may arise when repairing equipment, e.g., calling for a replacement rather than a repair. The user may be prompted with information about the change (e.g., price, timing, efficiency), and may interact with the newsfeed to change the plan, if desired. Further, in at least some embodiments, the user may have data that the heterogeneous systems do not have, and thus this interaction or modification of the plan may provide a point in the process where the user can supply such missing information. For example, drilling scheduling may have been altered, but the overall system may not be "aware" of the change, and may thus be operating on obsolete scheduling information. The user may update the scheduling information, which may in turn change the plan, e.g., timing of activities, as such the plan may adjust dynamically in response to the data representing the information that the user has, which the heterogeneous systems do not (prior to adjusting, or possibly even after adjusting) have.

In at least some embodiments, the heterogeneous systems include one or more business technology systems (e.g., financial databases) and one or more technical systems. The technical systems may be configured to monitor and/or control equipment that supports the (e.g., oil) field operations.

In at least some embodiments, assembling the plan at 706 includes determining an actionable insight based on data representing a condition of a physical component or a system of components and one or more digital twins representing the physical component. Further, determining the actionable insight may, in some embodiments, include modeling one or more oilfield conditions using a computer model. As noted above, such modeling may be accomplished with little or no user intervention; that is, the computer model may be run without interaction from the user, e.g., with the assistance of a subject matter expert who is not the user, or without human intervention.

Determining the actionable insight may also include determining one or more consequences of one or more actions that can be taken in response to the actionable insight based at least in part on an output of the computer model, selecting one or more of the actions as recommended. According displaying (e.g., the displaying the newsfeed) at 708 may include presenting at least one of the one or more consequences to the user along with the selected one or more actions.

Further, in at least some embodiments, artificial intelligence may be used to determine the actionable insight. Accordingly, in such embodiments, the method 700 may include training a machine learning model to predict a user selection in response to the actionable insight, and predicting a response from the user using the machine learning model, based on the actionable insight.

Computing Environment

Figure 8:
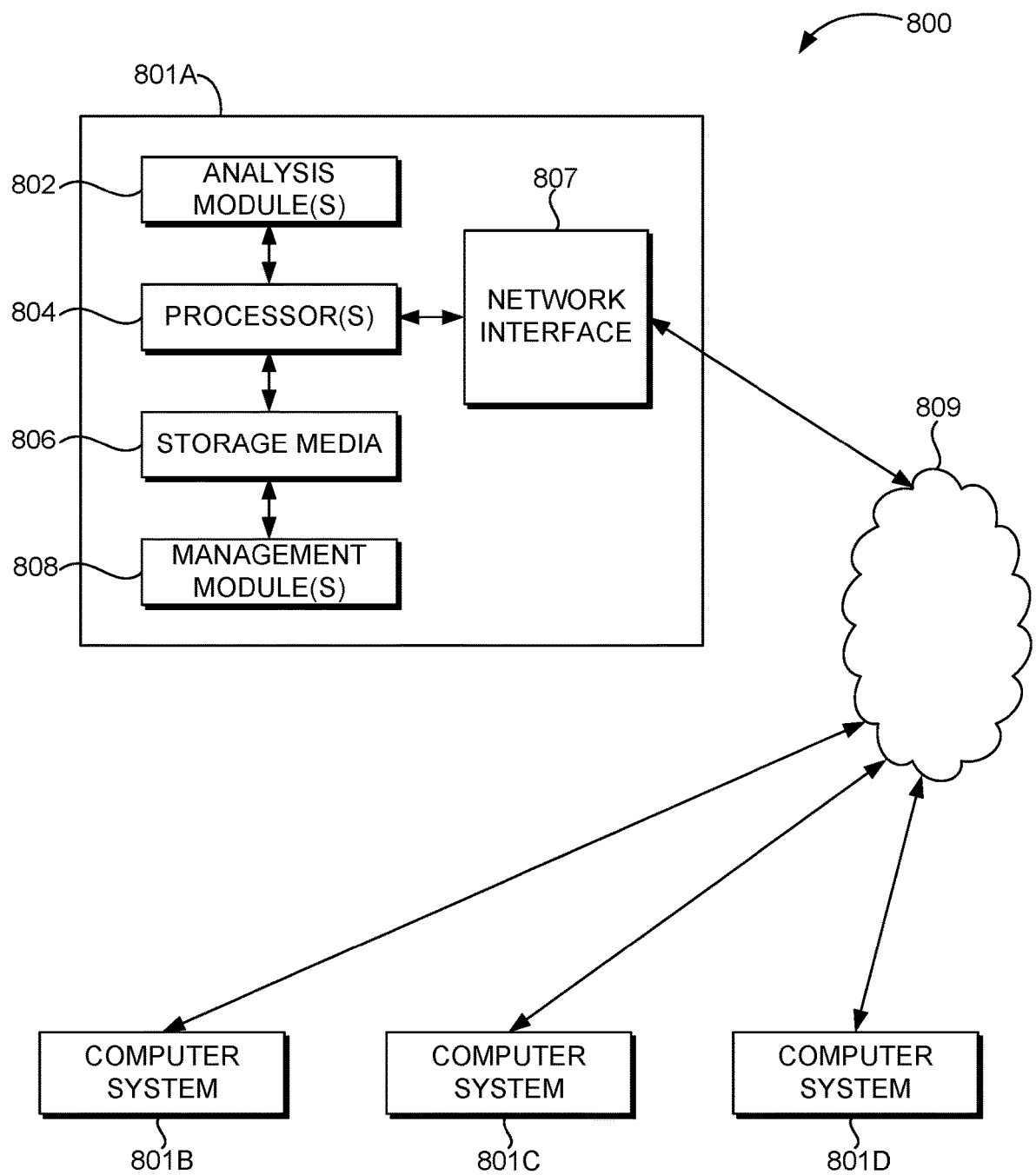
FIG. 8 illustrates a schematic view of a computing system, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more management module(s) 808. In the example of computing system 800, computer system 801A includes the management module 808. In some embodiments, a single management module may be used to perform some aspects of one or more embodiments of the methods disclosed herein. In other embodiments, a plurality of management modules may be used to perform some aspects of methods herein.

It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method, comprising:
receiving data from a plurality of heterogeneous systems, the heterogeneous systems configured to orchestrate operations in different aspects of field operations;
selecting a subset of the data based on one or more attributes associated with a user;
generating an actionable insight via a neural network, wherein the actionable insight identifies a problem and at least one solution action of one or more solution actions;
assembling a plan for conducting one or more of the field operations using at least one of the heterogeneous systems, wherein the plan comprises a listing of scheduled events, a status of a request at stages of a lifecycle, an indication of an activity and a timing of conducting the activity, monitoring, suggesting repairs, receiving authorization, matching a service vendor with a wellsite and task, and providing status updates of progress of the service vendor to the user;
transmitting the subset of the data to the user for display via a graphical user interface in context with at least a portion of the plan comprising the actionable insight;
receiving a command from the user in response to display of the subset of the data in context with at least a portion of the plan comprising the actionable insight;
engaging one or more fulfillment engines of the plurality of heterogeneous systems to automatically execute the one or more of the field operations in response to receiving the command via a user interaction with the graphical user interface;
feeding back at least information as to success of the at least one solution action addressing the problem to a machine learning model of the neural network as training data; and
retraining the machine learning model utilizing at least the training data fed back to the machine learning model.

2. The method of claim 1, further comprising engaging a commercial system of the plurality of heterogeneous systems to execute at least one commercial action in response to the command, wherein the one or more fulfillment engines are engaged at least partially in response to the at least one commercial action being executed, and wherein the commercial system includes one or more business technology systems, the heterogeneous systems also including one or more technical systems configured to monitor, control, or both monitor and control equipment that supports the field operations.

3. The method of claim 2, wherein engaging the commercial system comprises accessing data representing a basic operating protocol for an entity, pricing data, deliverable timelines, or a combination thereof.

4. The method of claim 1, wherein the one or more attributes associated with the user comprise at least one of: an organization of the user, a role of the user, or an operation for which the user is responsible.

5. The method of claim 1, further comprising allowing the user to adjust the plan dynamically, using a series of events or prompts that the user follows to make decisions.

6. The method of claim 1, wherein assembling the plan comprises preparing the plan from discrete different tasks in different environments using two or more of the plurality of heterogeneous systems.

7. The method of claim 1, further comprising adjusting the plan dynamically in response to user interaction with a series of events or prompts.

8. The method of claim 1, wherein displaying comprises curating a newsfeed of events based on relevance to the user, a temporal proximity of the events, or a combination thereof.

9. The method of claim 1, wherein the one or more of the field operations comprise exploration activities, drilling activities, production activities, equipment service, or a combination thereof.

10. The method of claim 1, wherein the command includes data representing information that the user has, which the heterogeneous systems do not have, and wherein allowing the user to adjust the plan dynamically comprises adjusting the plan in response to the data representing the information that the user has, which the heterogeneous systems do not have.

11. The method of claim 1, wherein the actionable insight is based on data representing a condition of a physical component or a system of components and one or more digital twins representing the physical component.

12. The method of claim 11, wherein:
determining the actionable insight comprises:
modeling one or more oilfield conditions using a computer model, wherein the computer model is run without interaction from the user;
determining one or more consequences of the one or more solution actions in response to the actionable insight based at least in part on an output of the computer model; and
selecting one or more of the one or more solution actions as recommended as the at least one solution action; and
displaying comprises presenting at least one of the one or more consequences to the user along with the at least one solution action.

13. The method of claim 11, wherein retraining the machine learning model comprises training the machine learning model to predict a user selection in response to the actionable insight; and
predicting a response from the user using the machine learning model, based on the actionable insight.

14. A non-transitory, computer-readable medium storing instructions that, when executed by at least one processor of a computing system, cause the computing system to perform operations, the operations comprising:
receiving data from a plurality of heterogeneous systems, the heterogeneous systems configured to orchestrate operations in different aspects of field operations;
selecting a subset of the data based on one or more attributes associated with a user;
generating an actionable insight via a neural network, wherein the actionable insight identifies a problem and at least one solution action of one or more solution actions;
assembling a plan for conducting one or more of the field operations using at least one of the heterogeneous systems, wherein the plan comprises a listing of scheduled events, a status of a request at stages of a lifecycle, an indication of an activity and a timing of conducting the activity, monitoring, suggesting repairs, receiving authorization, matching a service vendor with a well-site and task, and providing status updates of progress of the service vendor to the user;
transmitting the subset of the data to the user for display via a graphical user interface in context with at least a portion of the plan comprising the actionable insight;
receiving a command from the user in response to display of the subset of the data in context with at least a portion of the plan comprising the actionable insight;
engaging one or more fulfillment engines of the plurality of heterogeneous systems to automatically execute the one or more of the field operations in response to receiving the command via a user interaction with the graphical user interface;
feeding back at least information as to success of the at least one solution action addressing the problem to a machine learning model of the neural network as training data; and
retraining the machine learning model utilizing at least the training data fed back to the machine learning model.

15. The medium of claim 14, wherein the one or more attributes associated with the user comprise at least one of: an organization of the user, a role of the user, or an operation for which the user is responsible.

16. The medium of claim 14, wherein the operations further comprise allowing the user to adjust the plan dynamically, using a series of events or prompts that the user follows to make decisions.

17. The medium of claim 14, wherein assembling the plan comprises preparing the plan from discrete different tasks in different environments using two or more of the plurality of heterogeneous systems.

18. The medium of claim 14, wherein displaying comprises curating a newsfeed of events based on relevance to the user, a temporal proximity of the events, or a combination thereof.

19. The medium of claim 16, wherein the command includes data representing information that the user has, which the heterogeneous systems do not have, and wherein allowing the user to adjust the plan dynamically comprises adjusting the plan in response to the data representing the information that the user has, which the heterogeneous systems do not have.

20. A computing system, comprising:
one or more processors; and
a memory system including one or more non-transitory, computer-readable media storing instructions that, when executed by at least one of the one or more processors, cause the computing system to perform operations, the operations comprising:
receiving data from a plurality of heterogeneous systems, the heterogeneous systems configured to orchestrate operations in different aspects of field operations;
selecting a subset of the data based on one or more attributes associated with a user;

generating an actionable insight via a neural network, wherein the actionable insight identifies a problem and at least one solution action of one or more solution actions;

assembling a plan for conducting one or more of the field operations using at least one of the heterogeneous systems, wherein the plan comprises a listing of scheduled events, a status of a request at stages of a lifecycle, an indication of an activity and a timing of conducting the activity, monitoring, suggesting repairs, receiving authorization, matching a service vendor with a wellsite and task, and providing status updates progress of the service vendor to the user, and wherein the actionable insight is based on data representing a condition of a physical component or a system of components and one or more digital twins representing the physical component, and wherein determining the actionable insight comprises modeling one or more oilfield conditions using a computer model, wherein the computer model is run without interaction from the user, determining one or more consequences of the one or more solution actions in response to the actionable insight based at least in part on an output of the computer model, and selecting one or more of the one or more solution actions as recommended as the at least one solution action;

transmitting the subset of the data to the user for display via a graphical user interface in context with at least a portion of the plan, wherein displaying comprises presenting at least one of the one or more consequences to the user along with the at least one solution action;

receiving a command from the user in response to display of the subset of the data;

engaging one or more fulfillment engines of the plurality of heterogeneous systems to execute the one or more of the field operations in response to receiving the command via a user interaction with the graphical user interface;

feeding back at least information as to success of the at least one solution action addressing the problem to a machine learning model of the neural network as training data; and retraining the machine learning model utilizing at least the training data fed back to the machine learning model.

* * * * *